US010126769B2

(12) United States Patent
Xu et al.

(10) Patent No.: US 10,126,769 B2
(45) Date of Patent: Nov. 13, 2018

(54) CLASS-D DRIVEN LOW-DROP-OUTPUT (LDO) REGULATOR

(71) Applicant: Marvell World Trade Ltd., St. Michael (BB)

(72) Inventors: Weiwei Xu, San Jose, CA (US); Xiaoyue Wang, San Jose, CA (US)

(73) Assignee: Marvell World Trade Ltd., St. Michael (BB)

(*) Notice: Subject to any disclaimer, the term of this patent is extended or adjusted under 35 U.S.C. 154(b) by 0 days.

(21) Appl. No.: 15/664,708

(22) Filed: Jul. 31, 2017

(65) Prior Publication Data

US 2018/0074536 A1 Mar. 15, 2018

Related U.S. Application Data

(60) Provisional application No. 62/393,396, filed on Sep. 12, 2016.

(51) Int. Cl.
*H02M 3/156* (2006.01)
*G05F 1/575* (2006.01)

(52) U.S. Cl.
CPC .................................... *G05F 1/575* (2013.01)

(58) Field of Classification Search
CPC .............................. H02M 3/156; H02M 3/158
USPC .................................................. 323/272, 282
See application file for complete search history.

(56) References Cited

U.S. PATENT DOCUMENTS

| | | | | |
|---|---|---|---|---|
| 5,838,271 | A * | 11/1998 | Park | H03M 1/682 341/118 |
| 6,150,803 | A * | 11/2000 | Varga | H02M 3/1584 307/60 |
| 6,969,977 | B1 * | 11/2005 | Smith | H02M 1/36 323/222 |
| 7,319,311 | B2 * | 1/2008 | Nishida | H01M 10/44 323/268 |
| 7,982,445 | B1 * | 7/2011 | Xin-LeBlanc | H02M 3/158 323/282 |
| 8,330,442 | B2 * | 12/2012 | Han | H02M 3/158 323/282 |
| 9,729,058 | B2 * | 8/2017 | Larosa | H02M 3/158 |
| 2002/0151183 | A1 * | 10/2002 | Yang | H01L 21/28114 438/714 |
| 2005/0030770 | A1 * | 2/2005 | Sutardja | H02M 3/1588 363/41 |
| 2005/0258811 | A1 * | 11/2005 | Matsuo | H02M 3/158 323/282 |

(Continued)

FOREIGN PATENT DOCUMENTS

KR 20150069408 6/2015

*Primary Examiner* — Adolf Berhane

(57) ABSTRACT

Embodiments described herein provide a voltage regulator that includes an error amplifier configured to provide a difference signal indicative of a voltage difference between a reference signal and a feedback signal, a pulse width modulation generator configured to receive the difference signal and to output a pulse width modulated signal based on the difference signal, and one or more transistors configured to receive the pulse width modulated signal at a gate of the one or more transistors, and to provide the feedback signal at a drain of the one or more transistors as a regulated voltage that is adjusted to match the reference signal so as to reduce the voltage difference between the reference signal and the feedback signal.

18 Claims, 12 Drawing Sheets

300

(56) References Cited

U.S. PATENT DOCUMENTS

2006/0043952 A1* 3/2006 Huang .................. H02M 3/158 323/282
2006/0273769 A1* 12/2006 Chang .................. H02M 3/156 323/271
2007/0046273 A1* 3/2007 Riehl .................... H02M 3/156 323/282
2008/0024100 A1* 1/2008 Huang .................. H02M 3/158 323/282
2008/0129377 A1 6/2008 You et al.
2009/0121697 A1* 5/2009 Aiura .................... H02M 3/156 323/286
2009/0315523 A1* 12/2009 Kumagai .............. H02M 3/156 323/272
2010/0019748 A1* 1/2010 Kleine .................. H02M 3/158 323/282
2010/0033153 A1* 2/2010 Xing ..................... H02M 3/156 323/288
2010/0315057 A1* 12/2010 Zambetti ............... H02M 3/156 323/284
2011/0018508 A1* 1/2011 Ueunten .............. H03K 17/122 323/272
2011/0031948 A1* 2/2011 Chien ................. H02M 3/1588 323/282
2011/0057635 A1* 3/2011 Ishikawa ................. H02M 1/36 323/282
2011/0101940 A1* 5/2011 Kudo ................. H02M 3/1584 323/282
2011/0215784 A1* 9/2011 Hoogzaad ............. H02M 3/156 323/285
2012/0153910 A1 6/2012 Bulzacchelli et al.
2013/0009621 A1 1/2013 Chen
2014/0084886 A1* 3/2014 Causse .................. H02M 3/158 323/282
2014/0103993 A1* 4/2014 Chen .......................... G05F 1/46 327/540
2014/0176095 A1* 6/2014 Yang ..................... H02M 3/156 323/271
2016/0118881 A1* 4/2016 Schmitz ................ H02M 3/156 323/271
2016/0380537 A1* 12/2016 Bizjak ................... H02M 3/156 323/271

* cited by examiner

100

200

| | | |
|---|---|---|
| LDO | |  |
| Control | | Class-D LDO |
| $I_{quiescent}$ | | ✓ |
| Area | PMOS | ✓ |
| | Driver | ✓ |
| Ripple | | ✓ |

400

1100

| | |
|---|---|
| Process | 28nm |
| Vin (V) | 1.2-1.8 |
| Vout (V) | 1.05 |
| Iq (μA) | 152 |
| Imax (mA) | 1000 |
| Cout | 1μF |
| Transient ΔVout | 40mV |
| Output Ripple | Linear |
| Controller Area ($mm^2$) | 0.0013 |
| $FOM_T$(ps)= Cout*ΔV*Iq/$Imax^2$ | 6.08 |
| $FOM_A$ ($mm^2$/A)= Controller Area/Imax | 0.0013 |

FIG. 11

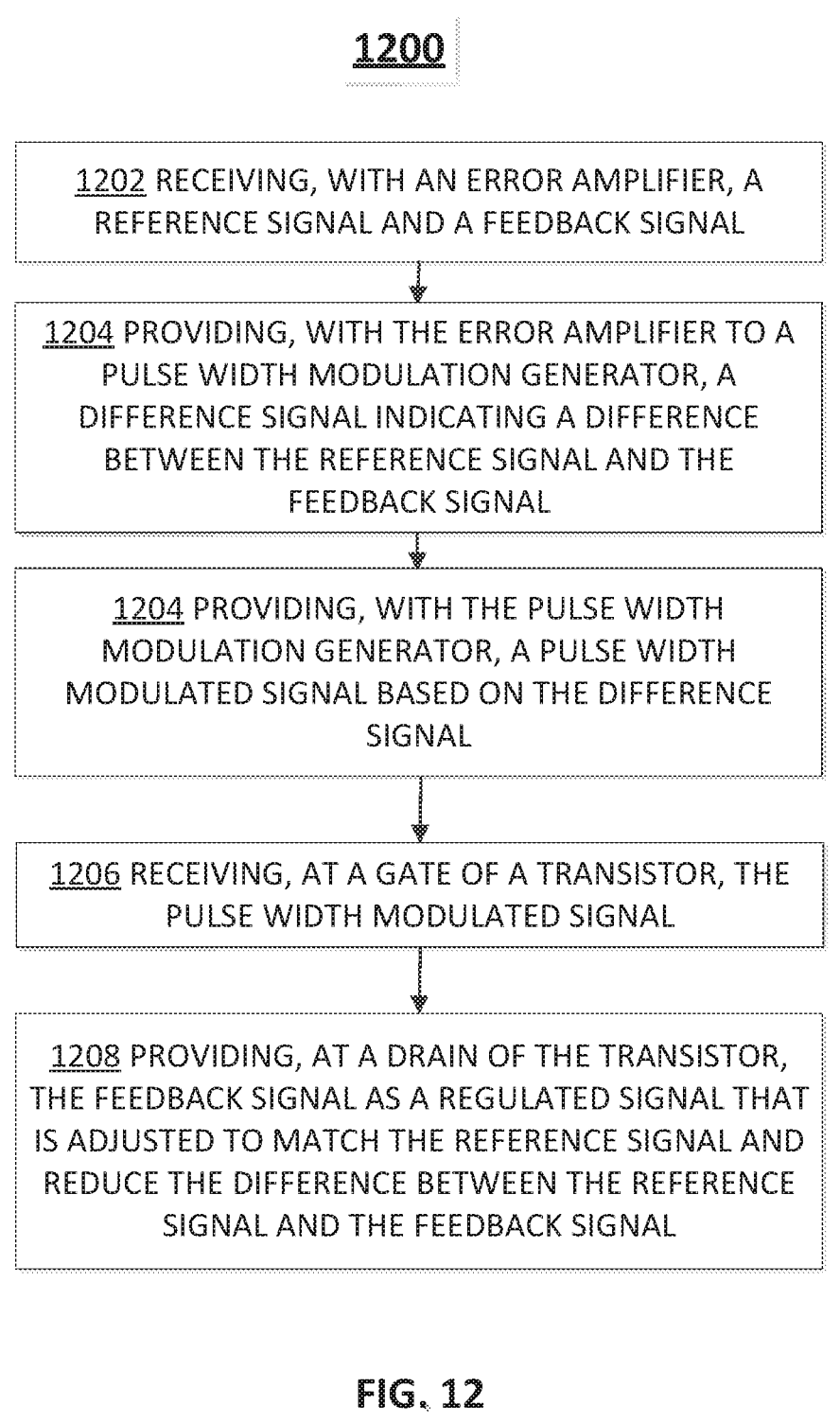

1200

1202 RECEIVING, WITH AN ERROR AMPLIFIER, A REFERENCE SIGNAL AND A FEEDBACK SIGNAL

↓

1204 PROVIDING, WITH THE ERROR AMPLIFIER TO A PULSE WIDTH MODULATION GENERATOR, A DIFFERENCE SIGNAL INDICATING A DIFFERENCE BETWEEN THE REFERENCE SIGNAL AND THE FEEDBACK SIGNAL

↓

1204 PROVIDING, WITH THE PULSE WIDTH MODULATION GENERATOR, A PULSE WIDTH MODULATED SIGNAL BASED ON THE DIFFERENCE SIGNAL

↓

1206 RECEIVING, AT A GATE OF A TRANSISTOR, THE PULSE WIDTH MODULATED SIGNAL

↓

1208 PROVIDING, AT A DRAIN OF THE TRANSISTOR, THE FEEDBACK SIGNAL AS A REGULATED SIGNAL THAT IS ADJUSTED TO MATCH THE REFERENCE SIGNAL AND REDUCE THE DIFFERENCE BETWEEN THE REFERENCE SIGNAL AND THE FEEDBACK SIGNAL

FIG. 12

CLASS-D DRIVEN LOW-DROP-OUTPUT (LDO) REGULATOR

CROSS REFERENCE TO RELATED APPLICATION

This disclosure claims the benefit under 35 U.S.C. § 119(e) of U.S. Provisional Application No. 62/393,396, filed on Sep. 12, 2016, which is incorporated herein by reference in its entirety.

FIELD OF USE

This disclosure relates generally to a low-drop-output (LDO) regulator, and more particularly to an LDO regulator that has low quiescent current and is area efficient.

BACKGROUND

An LDO regulator regulates a DC supply for electronic systems and needs to maintain a specified output voltage over a wide range of load current and input voltage, down to very small difference between input and output voltages. Today's high-throughput wireless system-on-chips (SOCs) require large dynamic range of supply current, which demands a high current capacity LDO. In existing LDO regulators, the size of the power transistor of the LDO scales up with the maximum load current, such that an LDO regulator capable of handling large load currents require large size have sub-optimal area efficiency.

SUMMARY

Embodiments described herein provide a voltage regulator that includes an error amplifier configured to provide a difference signal indicative of a voltage difference between a reference signal and a feedback signal, a pulse width modulation generator configured to receive the difference signal and to output a pulse width modulated signal based on the difference signal, and one or more transistors configured to receive the pulse width modulated signal at a gate of the one or more transistors, and to provide the feedback signal at a drain of the one or more transistors as a regulated voltage that is adjusted to match the reference signal so as to reduce the voltage difference between the reference signal and the feedback signal.

In some implementations, a state of the one or more transistors is determined by widths of pulses in the pulse width modulated signal.

In some implementations, the one or more transistors include at least a first transistor, the pulse width modulation generator includes at least a second transistor and a third transistor, the second transistor and the third transistor share a drain node that is connected to a gate of the first transistor. In some implementations, the pulse width modulated signal is a first pulse width modulated signal and is received by the first transistor, a gate of the second transistor is configured to receive a second pulse width modulated signal that has pulse widths defining time intervals during which increased current passes through the second transistor, causing a voltage at the gate of the first transistor to increase, and a gate of the third transistor is configured to receive a third pulse width modulated signal that has pulse widths defining time intervals during which decreased current passes through the third transistor, causing the voltage at the gate of the first transistor to decrease.

In some implementations, the gate of the one or more transistors has a gate voltage that is pulled up to decrease an amount of current flowing through the one or more transistors and to decrease the amplitude of the feedback signal, when an amplitude of the feedback signal is greater than an amplitude of the reference signal, the gate voltage is pulled down to increase the amount of current flowing through the one or more transistors and to increase the amplitude of the feedback signal, when the amplitude of the feedback signal is less than the amplitude of the reference signal, and the gate voltage is maintained unchanged to maintain the amplitude of the feedback signal, when the amplitude of the feedback signal is equal to the amplitude of the reference signal.

In some implementations, the one or more transistors is formed with a material having a low pass filter characteristic to low pass filter the pulse width modulated signal at the gate of the one or more transistors and thereby suppress switching ripple in the voltage regulator.

In some implementations, the one or more transistors is implemented as an array of transistors including transistors having gates connected in series. In some implementations, the gates of the one or more transistors in the array of transistors include polycrystalline silicon material to low pass filter the pulse width modulated signal. In some implementations, the transistors in the array of transistors share same drain nodes and source nodes.

In some implementations, the voltage regulator is configured to output a regulated voltage in a bandwidth between 1 and 10 MHz.

Embodiments described herein provide a method of regulating an output voltage. An error amplifier receives a reference signal and a feedback signal, and provides to a pulse width modulation generator, a difference signal indicating a voltage difference between the reference signal and the feedback signal. The pulse width modulation generator provides a pulse width modulated signal based on the difference signal. A gate of one or more transistors receives the pulse width modulated signal. A drain of the one or more transistors provides the feedback signal as a regulated voltage that is adjusted to match the reference signal so as to reduce the voltage difference between the reference signal and the feedback signal.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 11 is a diagram of a table summarizing parameters and measurements from an example Class-D LDO regulator, in accordance with an embodiment of the present disclosure; and FIG. 12 is a high level flow chart for a process for using a Class-D LDO regulator, in accordance with an embodiment of the present disclosure.

DETAILED DESCRIPTION

This disclosure generally relates to a low-drop-output (LDO) regulator, as well as an LDO regulator that has low quiescent current and is area efficient. To provide an overall understanding of the disclosure, certain illustrative embodiments will now be described, including an LDO regulator that has a distributed-gate-resistance power transistor that achieves low quiescent current, low output ripple, and small silicon area. However, it will be understood by one of ordinary skill in the art that the systems and methods described herein are adapted and modified as is appropriate for the application being addressed, and that the systems and methods described herein are employed in other suitable applications, and that such other additions and modifications will not depart from the scope thereof.

An LDO regulator maintains a specified output voltage over a wide range of load current and input voltage, down to very small difference between input and output voltages. An analog LDO consumes high quiescent current to drive a large power transistor for loop stability. For a digital LDO, the control circuits increase with the size of the power transistor, which results in more area overhead and design complexity.

Figure 1:
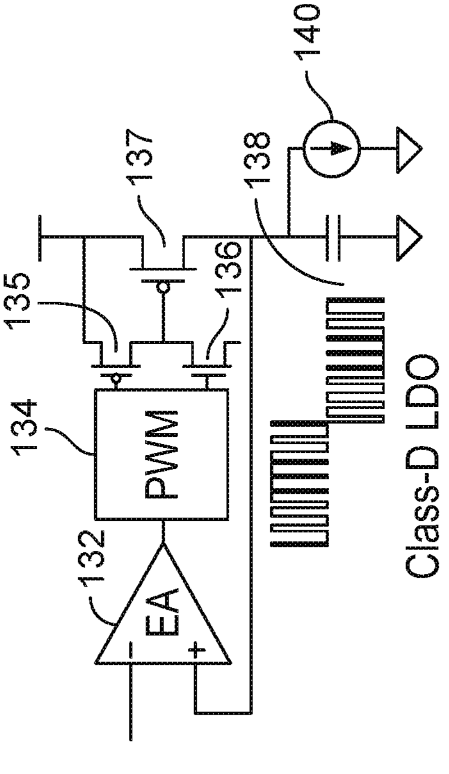
FIG. 1 is a block diagram of a Class-D LDO regulator, in accordance with an embodiment of the present disclosure.

FIG. 1 is a diagram a Class-D LDO regulator 100, in accordance with an embodiment of the present disclosure. The Class-D driven LDO regulator 100 includes an error amplifier 132, a pulse width modulation (PWM) generator 134, a set of transistors 135, 136, and 137, a capacitor 138, and a current source 140, in an embodiment.

The error amplifier 132 compares a reference signal voltage (Vref, top input) and a feedback voltage (Vfb) of the transistor 137 to obtain a difference signal and provides the difference signal to the PWM generator 134. The PWM generator 134 provides PWM signals to the gates of the PMOS transistor 135 and the NMOS transistor 136, which are connected at their drains and provide input to the gate of the PMOS transistor 137. While the transistors 135 and 136 are depicted in FIG. 1 as being separate from the PWM generator 134, in some embodiments, the transistors 135 and 136 are part of the PWM generator 134. The PMOS transistor 137 has a supply voltage of VDD at its source and an output voltage Vout at its drain.

In an embodiment, the gate of the PMOS transistor 137 receives a PWM signal that drives the PMOS transistor 137 and defines its state. In general, when the amplitude of Vfb is less than the amplitude of Vref, the difference signal is negative. In this case, it is generally desirable to pull the gate of the PMOS transistor 137 lower (e.g., by lowering the gate voltage), allowing more current to pass from the source to the drain of the PMOS transistor 137 and increasing Vout (which is fed back into the error amplifier 132 as Vfb, either as Vout itself or a fixed fraction thereof). Alternatively, when Vfb is greater than Vref, the difference signal is positive. In this case, it is generally desirable to pull the gate of the PMOS transistor 137 higher (e.g., by increasing the gate voltage), allowing less current to pass through the PMOS transistor 137 and decreasing Vout. When Vfb is equal to Vref, the difference signal is zero and it is generally desirable to hold the gate of the PMOS transistor 137 constant.

In an embodiment, the PMOS transistor 135 is referred to as a pull-up PMOS transistor, and the NMOS transistor 136 is referred to as a pull-down NMOS transistor. The PWM generator 134 provides an UP signal to the pull-up PMOS transistor 135 (which is active-low), and a DN signal to the pull-down NMOS transistor 136 (which is active-high).

In an embodiment, the states of the transistors 135, 136, and 137 take on any of four possibilities. In a first case, the PMOS transistor 135 is on and the NMOS transistor 136 is off. This causes the gate of the PMOS transistor 137 (which is referred to herein as a power transistor in some embodiments) to be pulled up. In a second case, the PMOS transistor 135 is off and the NMOS transistor 136 is on. This causes the gate of the PMOS transistor 137 to be pulled down. In a third case, the PMOS transistor 135 is off and the NMOS transistor 136 is off. This causes the gate of the PMOS transistor 137 to remain unchanged. In a fourth case, the PMOS transistor 135 is on and the NMOS transistor 136 is on. This results in a short circuit, which is not a useful state, but guarantees overlap of UP and DN.

The Class-D LDO regulator 100 employs PWM signals to drive the transistors 135, 136, and 137. Upon receiving the difference signal from the error amplifier 132, the PWM generator 134 generates PWM signals that have pulse widths derived from the amplitude of the difference signal. The widths of the pulses within the PWM signals provided to the gates of the transistors 135 and 136 control the state of the PMOS transistor 137, and allow more current, less current, or the same amount of current to pass through the PMOS transistor 137, thereby causing the output voltage Vout to decrease, increase, or maintained without change. The advantages of such an implementation are described in relation to FIG. 2. One possible implementation of the circuitry within the PWM generator 134 and the PWM signals is described in detail in relation to FIGS. 3 and 4.

Figure 2:
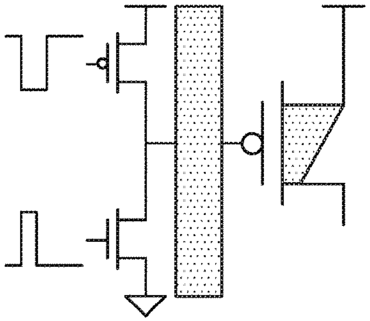
FIG. 2 is a table summarizing the advantages of Class-D LDO regulators, in accordance with an embodiment of the present disclosure.

FIG. 2 is a table 200 that describes the advantages of a Class-D LDO regulator, such as the Class-D LDO regulator 100, in accordance with an embodiment of the present disclosure. The table 200 summarizes the advantages (indicated by a check mark) of Class-D LDO regulators (such as Class-D LDO regulator 100). The diagram in the top row of the table represents simplified circuit diagrams of the Class-D LDO regulator. The shaded rectangle represents an effective signal swing at the gate of the final PMOS transistor (e.g., the power transistor). The Class-D LDO regulator 100 uses the full swing between VDD and VSS, having a range of VDD-VSS. The shaded region within the power transistor represents the concentration of the inverse carrier in the channel. Compared to other LDO regulators, such as analog LDO regulators, the Class-D LDO regulator 100 is capable of carrying higher current density.

Analog LDO regulators require large quiescent current and have large PMOS area (e.g., area of the power transistor). Digital LDO regulators have output ripple and large driver area. By avoiding the disadvantages of analog LDO regulators and digital LDO regulators, the Class-D LDO regulator described herein has low quiescent current, has small PMOS area and small driver area, and has low output ripple. The Class-D LDO regulator is accordingly efficient in power and area.

Figure 3:
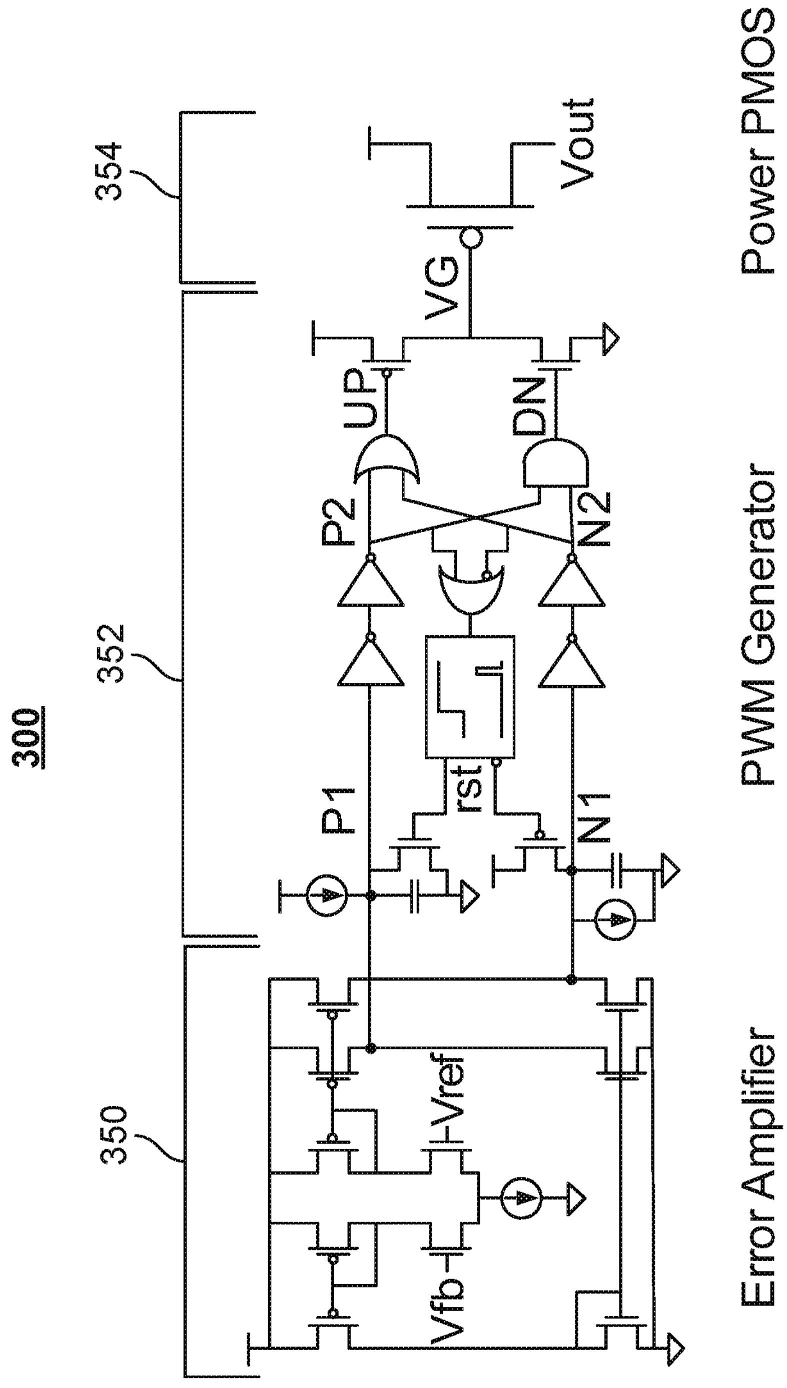
FIG. 3 is a detailed circuit diagram of a Class-D LDO regulator, in accordance with an embodiment of the present disclosure.

FIG. 3 is a diagram of an example circuit implementation of a Class-D driven LDO regulator 300, in accordance with an embodiment of the present disclosure.

The Class-D driven LDO regulator 300 includes an error amplifier 350, a PWM generator 352, and a power PMOS unit 354. Similar to the Class-D LDO regulator 100 described in relation to FIG. 1, the error amplifier 350 compares a feedback signal Vfb to a reference voltage Vref, and provides the difference signal to the PWM generator 352. Moreover, the PWM generator 352 generates two PWM signals based on the difference signal from the error amplifier 350. The first PWM signal is an "UP" signal, and the second PWM signal is a "DN" signal. As is described in detail below, the UP and DN signals are both used to control the voltage of the gate of the last PMOS transistor, VG within the power PMOS unit 354. Specifically, the UP signal is provided to the gate of a PMOS transistor within the power PMOS unit 354, and the DN signal is provided to the gate of an NMOS transistor within the power PMOS unit 354. The PMOS and NMOS transistors are connected in series at their drains, which provides input to the gate of a final PMOS transistor within the power PMOS unit 354. The final PMOS transistor provides the output voltage Vout. In general, the feedback voltage Vfb is equal to or lower than the output voltage Vout, in some embodiments. In some embodiments, the feedback voltage Vfb is the same as the output voltage Vout. In other embodiments, a voltage divider is used to force Vfb to be a fixed fraction of Vout.

Figure 4:
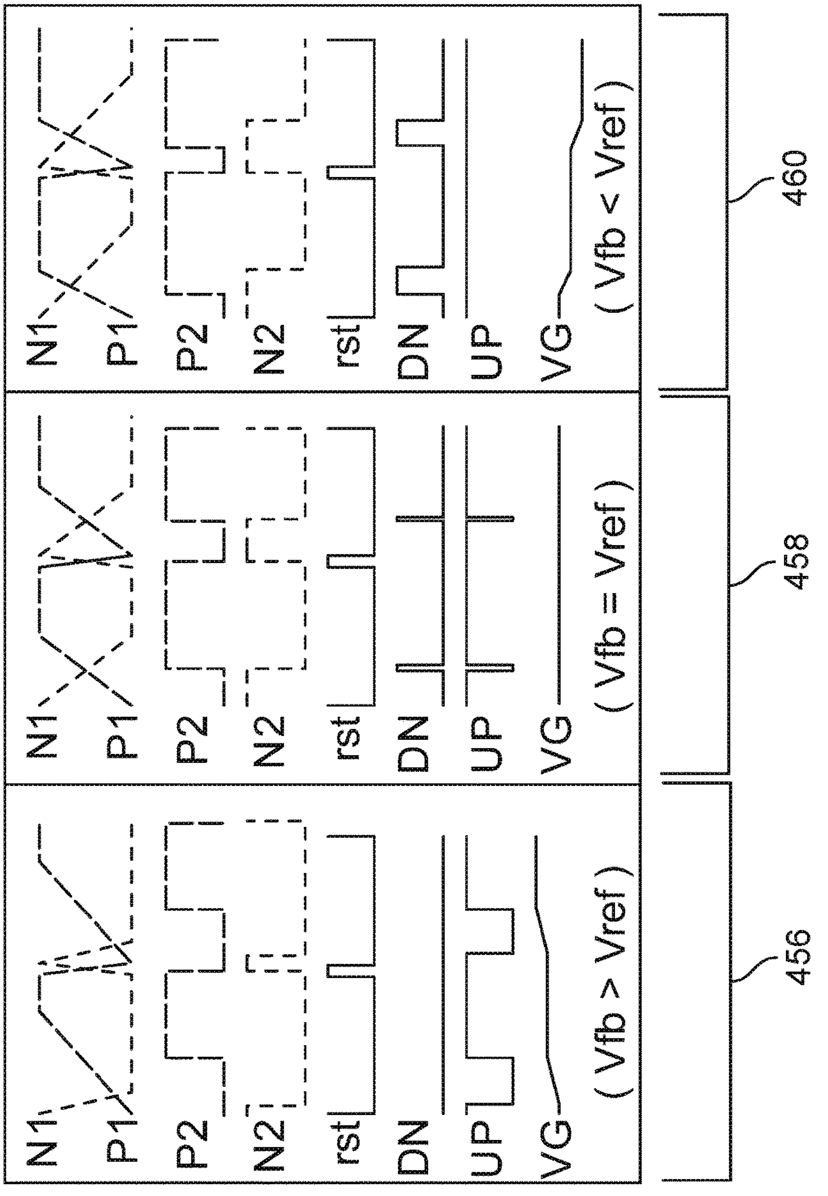
FIG. 4 depicts time plots indicating the voltage levels at various nodes within the circuit, in accordance with an embodiment of the present disclosure.

FIG. 4 depicts time plots for three different states of the Class-D LDO regulator 300, in accordance with an embodiment of the present disclosure. The three states include: a first state 456 when Vfb is greater than Vref (left), a second state 458 when Vfb is equal to Vref (middle), and a third state 460 when Vfb is less than Vref (right). The Class-D controller (e.g., the error amplifier 350 and the PWM generator 352) drives the power transistor gate (e.g., the power PMOS transistor 354, or more specifically, the right-most PMOS transistor in the power PMOS transistor 354). The power transistor gate voltage (VG) takes on one of three states (high, low, or holding), based on the feedback voltage Vfb. Specifically, VG is high when UP=0, DN=0. VG is low when UP=1, DN=1, and VG is holding when UP=1, DN=0. The pulse widths of the UP and DN signals are modulated by the error voltage Vfb-Vref.

The error amplifier 350 uses a transconductance stage to convert error voltage to output current. The tristate PWM generator 352 generates a reset pulse that sets the capacitor nodes P1 and N1 to VSS and VDD, respectively. These two nodes ramp up and down with a slope modulated by the output current of the error amplifier 350. The timing difference between P1 rising and N1 falling generates the differential PWM signals UP and DN.

In the first state 456, when Vfb is greater than Vref, the sink current from the output of the error amplifier 350 slows the voltage amplitude rising at P1 and enables the voltage amplitude to quickly fall at N1. This generates a down pulse at UP, which pulls up the power transistor gate, VG.

In the second state 458, when Vfb is equal to Vref, the DN signal stays mostly low and the UP signal stays mostly high. With logic gate delays, there are brief amounts of time of overlap, leading to a narrow overlap pulses in the UP and DN signals. This causes the power transistor gate VG to hold its existing voltage.

In the third state 460, when Vfb is less than Vref, the source current from the output of the error amplifier 350 makes the voltage amplitude rising at P1 faster and the voltage amplitude falling at N1 slower. This generates an up pulse at DN, which pulls down the power transistor gate, VG.

As described herein, in accordance with an embodiment, the Class-D LDO regulator circuit is configured to operate at low supply level, which makes it suitable for LDO applications. In some embodiments, the Class-D LDO regulator consumes 152 μA current at 120 MHz PWM operation frequency. The circuit diagram in FIG. 3 and the corresponding timing diagrams in FIG. 4 depict one illustrative example of an implementation of a Class-D LDO regulator. In general, any number of different implementations of a Class-D LDO regulator are used that include an error amplifier, a PWM generator, and one or more transistors, without departing from the scope of the present disclosure.

Since the transistors in the driver stage (e.g., the transistors driven by UP and DN signals in the PWM generator 352) behave as complementary switches (meaning that they have interconnections such that when one is on, the other is off, and vice versa), the Class-D driver has much lower quiescent current than a typical analog Class-A or Class-AB driver. Moreover, rail-to-rail output range is a benefit of a Class-D driver (as it is in the digital LDO), and it helps to increase the output current density of the power transistor. For the analog LDO regulator, headroom is reserved to keep the transistors in a saturation mode. For example, an analog LDO regulator may have an effective output range in the analog driver that is VDD-2VDSAT. In this case, a minimal voltage VDSAT is reserved for both PMOS and NMOS transistors. Hence, the Class-D structure described herein is suitable for LDO regulation and low supply applications.

Output ripple is an intrinsic problem in digital LDO regulators, due to the limited resolution of digitization. In particular, a digital LDO regulator activates a discrete number of power transistor units, each of which is configured to deliver a discrete amount of unit current, such that a switching ripple occurs when the load current is not an integer multiple of the unit current. By continuously modulating pulse width, for instance with an analog error amplifier, in an embodiment, the Class-D LDO regulator avoids output ripple that is inherent in a digital LDO regulator because of its finite resolution. In an example, in order to keep the ripple as low as analog control, the Class-D driver (e.g., the PWM generator 352) outputs a tristate PWM signal (e.g., VG at the power PMOS 354). The power transistor gate VG senses digital pulses during transient response, but settles to an analog voltage level in the steady state. This behavior renders a Class-D LDO to be a ripple-less linear regulator.

To suppress the switching ripple at VG, a low pass filter (LPF) follows the Class-D driver, in an embodiment. For the Class-D LDO regulator as described herein, such a filter is also be used to suppress the output ripple at Vout. However, the introduction of an LPF following the Class-D LDO regulator would add an extra pole into the feedback loop. This is generally undesirable because the extra pole would introduce stability problems. In an embodiment, to compensate for the introduction of the pole, the circuit is redesigned to push the pole away from the loop bandwidth or to introduce a zero in the feedback loop. However, doing this would make the circuit complicated. To solve this problem, the PMOS transistor 137 from FIG. 1 is implemented as a distributed LPF in a power-transistor gate resistance Rg and capacitance Cg, in accordance with embodiments as are described below in relation to FIGS. 5-10.

Figure 5:
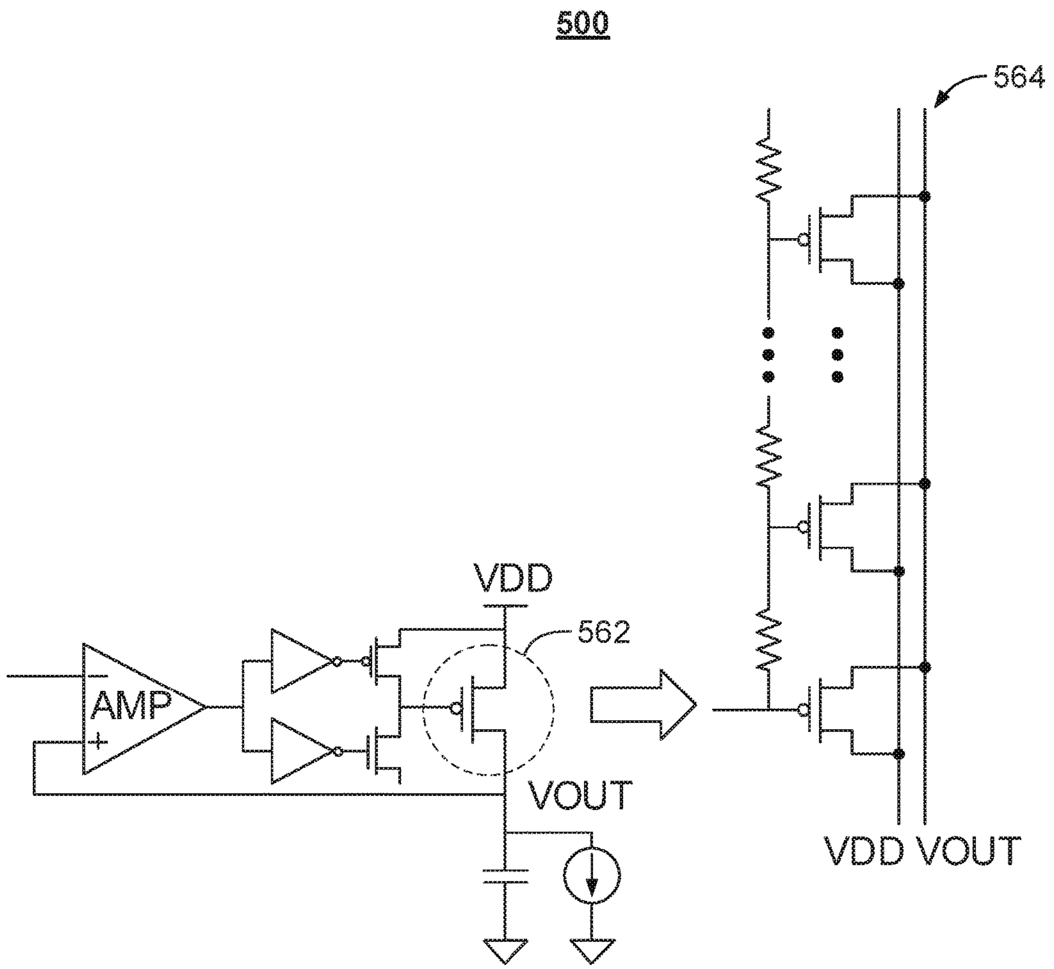
FIG. 5 is a circuit diagram of a power transistor implemented as a distributed system, in accordance with an embodiment of the present disclosure.

FIG. 5 is a circuit diagram 500 of a power transistor implemented as a distributed system, in accordance with an embodiment of the present disclosure. In an embodiment, the transistor 562 in the left circuit diagram of FIG. 5 is implemented as a distributed system 564 in the right circuit diagram of FIG. 5, in accordance with an embodiment of the disclosure. The distributed system 564 is referred to herein as a distributed-gate-resistance power transistor. The distributed system 564 includes an array of PMOS transistors. The drains of the PMOS transistors in the array of PMOS transistors are all connected to the same voltage Vout, and the sources of the PMOS transistors in the array of PMOS transistors are all connected to the same voltage VDD. The gates of the PMOS transistors in the array of PMOS transistors are connected to one another in series via resistors. In an embodiment, the array of transistors in the distributed system 564 functions as a distributed RC network, whose transfer function is depicted in FIG. 8.

Figure 6:
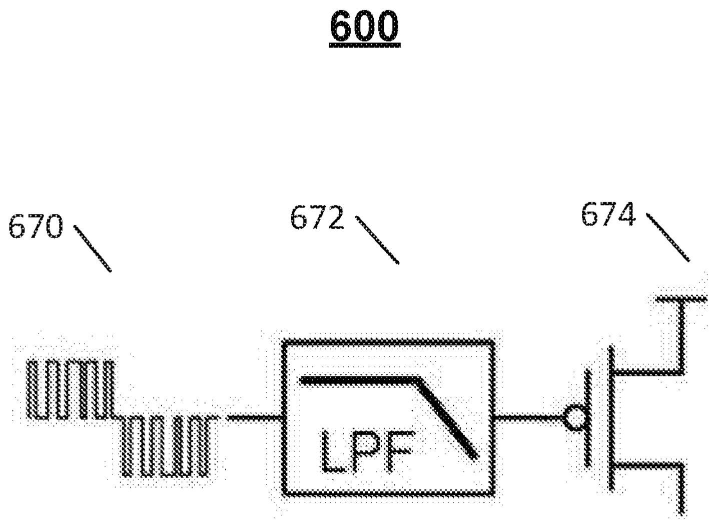
FIG. 6 is a diagram of a low pass filter that filters a pulse width modulated signal and provides the filtered signal to the gate of a PMOS transistor, in accordance with an embodiment of the present disclosure.

FIG. 6 depicts the LPF in a block diagram 700, in accordance with an embodiment of the present disclosure. The block diagram 600 depicts a tri-state PWM signal 670 that is provided to an LPF block 672, which low-pass filters the PWM signal 670 and provides the low-pass output to the gate of the PMOS transistor 674.

Figure 7:
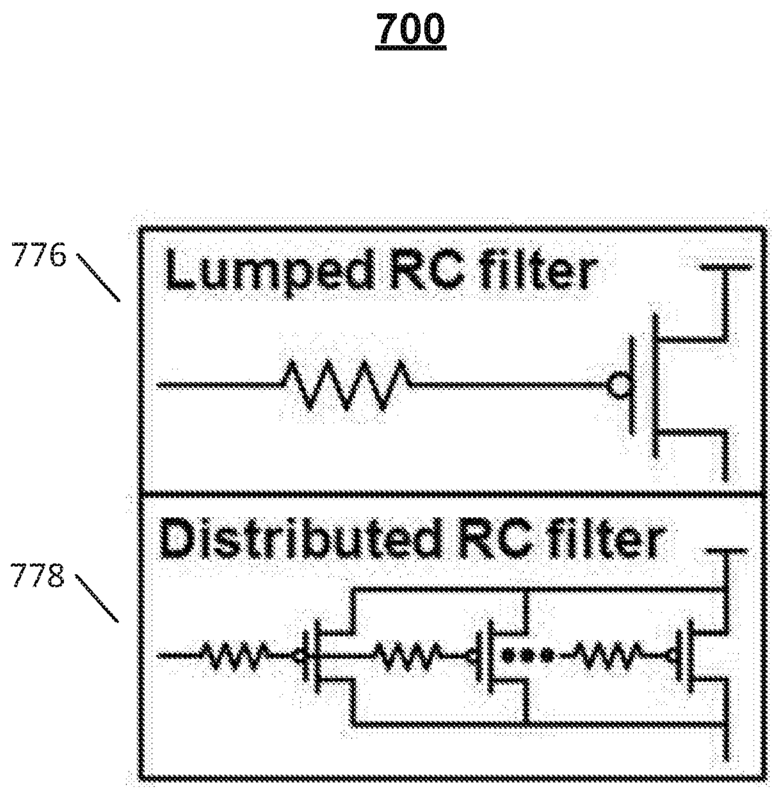
FIG. 7 is a diagram of a low pass filter that is implemented as a lumped RC filter or as a distributed RC filter, in accordance with an embodiment of the present disclosure.

FIG. 7 depicts the LPF in a circuit diagram 700, in accordance with an embodiment of the present disclosure. The circuit diagram 700 includes the diagram of a lumped RC filter 776 (with a simple resistor preceding the gate of a PMOS transistor) as well as the diagram of a distributed RC filter 778 (with an array of transistors connected to one another in the same manner as in the distributed system 564 in FIG. 5). Specifically, the distributed RC filter 778 includes an array of PMOS transistors, where their drains are connected to the same voltage, their sources are connected to the same voltage, and their gates are connected to one another in series via resistors.

Figure 8:
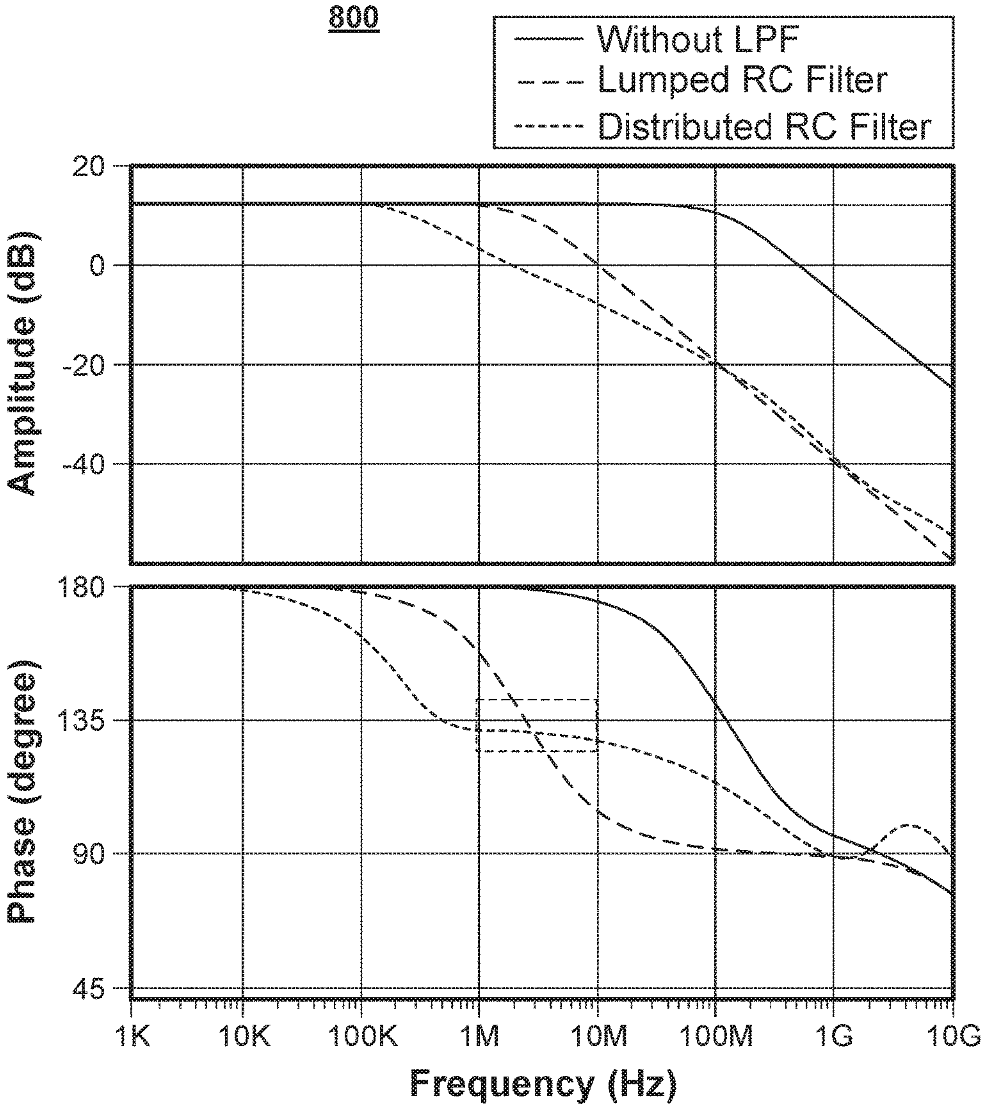
FIG. 8 is a plot of transfer functions of a low pass filter implemented as a lumped RC filter and as a distributed RC filter, in accordance with an embodiment of the present disclosure.

FIG. 8 depicts plots of the transfer function 800 of the LPF, in accordance with an embodiment of the present disclosure. The transfer function 800 includes a plot of the amplitude (on top, in dB) and a plot of the phase (on bottom, in degrees), both as a function of frequency (in Hz). Different transfer functions are shown for the Class-D LDO regulator (1) without an LPF, (2) with a lumped RC LPF, and (3) with a distributed RC filter, as described above in relation to FIGS. 5-7. Compared to the phase of the lumped RC filter, the phase of the distributed RC filter has a relatively flat region between 1 MHz and 10 MHz, indicating that this bandwidth is an appropriate operating range for the Class-D LDO regulator. In some embodiments, changing the characteristics of the Class-D LDO regulator, such as the capacitor and resistors and other internal circuit characteristics, adjusts the location of the flat region and changes the optimal bandwidth for the Class-LDO regulator.

Figure 9:
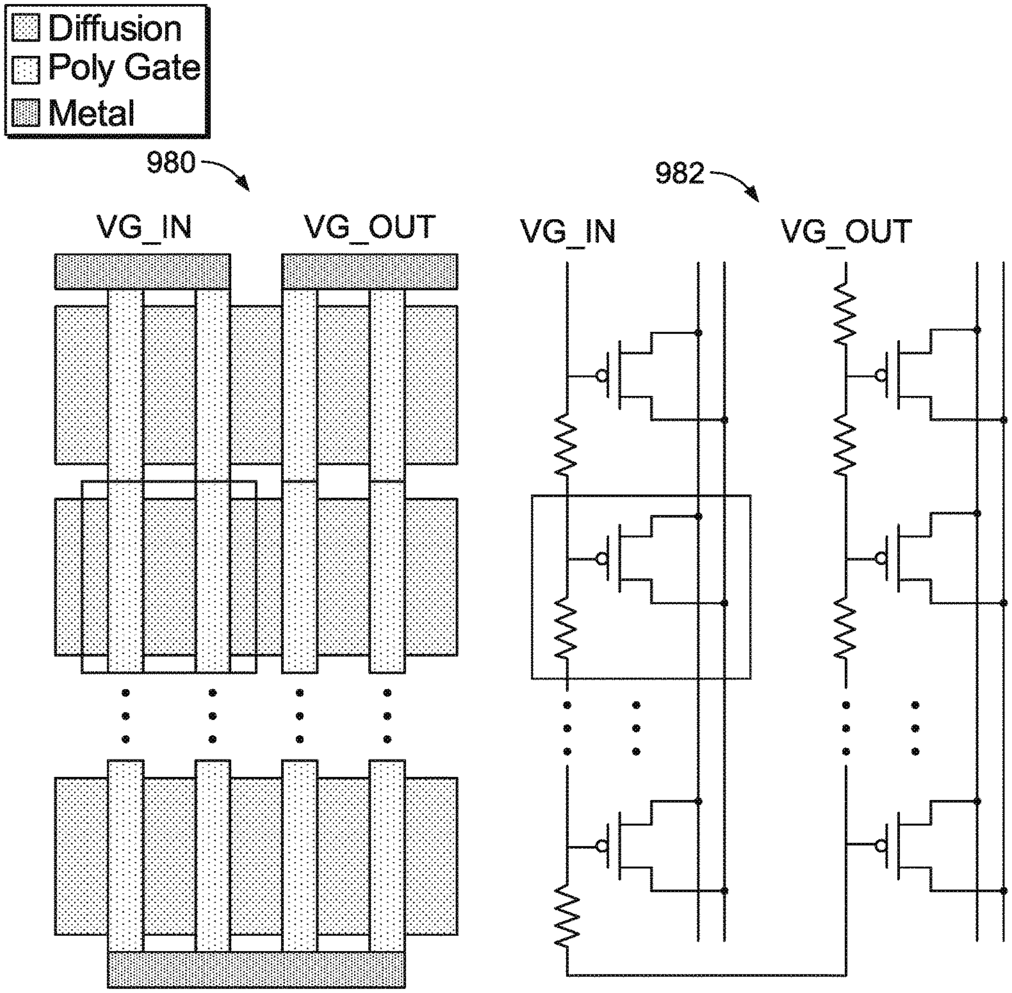
FIG. 9 is a diagram of a layout floor plan and a circuit diagram of a power transistor, in accordance with an embodiment of the present disclosure.

FIG. 9 depicts a layout floor plan 980 and a circuit diagram 982 for the distributed-gate-resistance power transistor, in accordance with an embodiment of the present disclosure. As in the distributed system 564 of FIG. 5, the circuit diagram 982 includes an array of transistors that have the same drain voltages (Vout), the same source voltages (VDD), and gates that are connected in series via resistors, which are referred to herein as "gate resistors". In particular, rather than connecting the array of transistors such that they all share the same gate voltage, the array of transistors are connected by gate resistors. Accordingly, the entire power transistor array is interpreted as a distributed RC network, in an embodiment. In some embodiments, the gate resistors are implemented as physical resistors connecting the gates of the transistors in the array in series. In other embodiments, no physical resistors are used, and the gate resistors are implemented by using a resistive or partially resistive material to form the gates of the transistors in the array. In an example, the gates are formed from a polycrystalline silicon material, which have some resistance to form built-in gate resistors. Forming the gate resistors through the inherent characteristics of the gate material is be desirable to increase area efficiency, in an embodiment.

The layout floor plan 980 depicts the layout of an implementation of the circuit diagram 982, where no physical resistors are used, and the gate resistors are implemented by using a polycrystalline silicon material for the gates. The layout floor plan 980 includes an input gate voltage VG_IN metal region and an output gate voltage VG_OUT metal region. Two parallel polycrystalline silicon gate ("poly gate") lines extend from the VG_IN metal region across a set of diffusion regions, and terminate at a bottom metal portion. Two more parallel poly gate lines extend from the bottom metal portion across the set of diffusion regions and terminate at the VG_OUT metal region. Rather than using physical resistors between the gates of the PMOS transistors, the layout floor plan 980 depicts an implementation in which the inherent resistance of poly gate material is used to provide resistance between the gates of the PMOS transistors in the circuit diagram 982.

Figure 10:
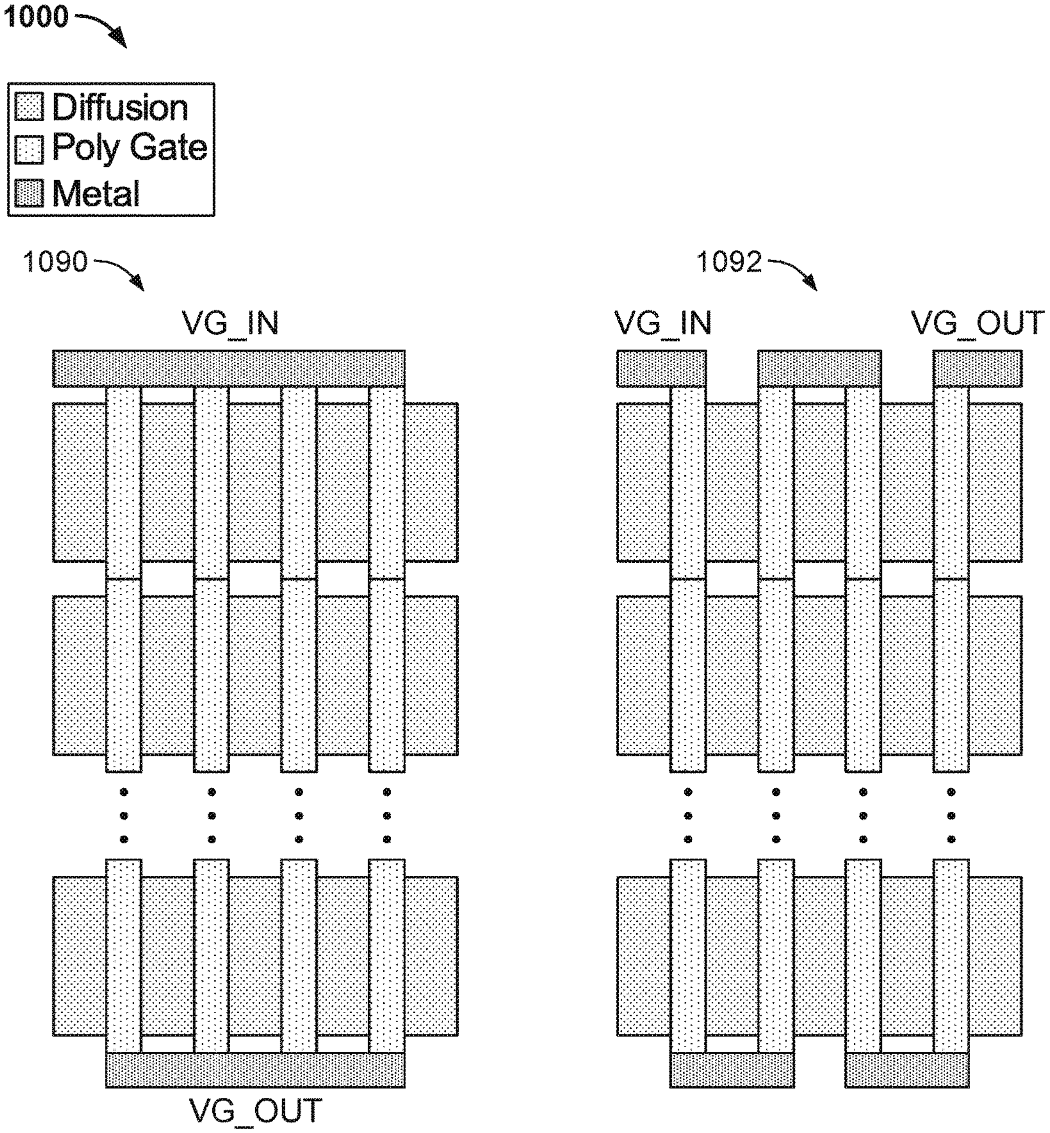
FIG. 10 is a diagram of layout floor plans of a power transistor implemented as a distributed system with an array of transistors connected in series and in parallel, in accordance with an embodiment of the present disclosure.

In the layout floor plan 980, two poly gate lines are shown in parallel, extending between VG_IN and the bottom metal region, or extending between the bottom metal region and VG_OUT. In general, any number of poly gate lines suitably is used, such as 1, 2, 3, 4, or any other number of poly gate lines. FIG. 10 includes two such examples.

FIG. 10 depicts two layout floor plans 1090 and 1092 for the distributed-gate-resistance power transistor, in accordance with an embodiment of the present disclosure. The layout floor plans 1090 and 1092 are similar to the layout floor plan 980, except that the poly gates are connected in parallel (1090) or in series (1092). In particular, the layout floor plan 1090 includes a VG_IN metal region, a VG_OUT metal region, and four parallel poly gate lines extending from VG_IN to VG_OUT. Alternatively, the layout floor plan 1092 includes a VG_IN metal region, a VG_OUT metal region, three intermediate metal regions, and a single poly gate line that snakes across the metal regions and terminates at VG_IN and VG_OUT.

FIG. 11 depicts a table 1100 that summarizes the performance of an example Class-D LDO regulator as described herein, in accordance with an embodiment of the present disclosure. In an example, a Class-D LDO regulator is fabricated in a 28 nm CMOS process. The input voltage ranges from 1.8 V to 1.2 V, and has an output voltage of 1.05V with 1 A load capacity. The power transistor in this work uses a 1.8 V PMOS with width 40 mm and length 0.18 μm. The sheet resistance of the salicide gate in the 28 nm CMOS process is about 30 Ω/sq. Rg is configurable by series or parallel connection of the transistor gates. In an example, Rg is selected to be 23 kΩ, to achieve fast transient response as well as robust stability. The LDO loop bandwidth is 2.5 MHz at full load, which is far below the PWM switching frequency. Without extra compensation, the LDO loop has worst-case 40 degree phase margin and 46 dB gain margin across corners and loads.

Based on measurements taken from a chip micrograph, the power transistor (e.g., the PMOS transistor 137 or the power transistor 354) occupies an area of approximately 380.130 $\mu m^2$, and the Class-D controller (e.g., the error amplifier 350 and the PWM generator 352) occupies an area of approximately 0.0013 $mm^2$. A minimum 1 ρF external capacitor is used for stability. The Class-D LDO regulator delivers 1 A of load current (Imax) while consuming about 152 μA quiescent current (Iq). In steady state, the measured output has no visible ripple, which is as good as a linear regulator. A power analyzer is used for a load test, in an embodiment. The transient overshoot and undershoot voltages are around 40 mV and 20 mV for a load step of 1000 mA/0.5 μs with supply at 1.35 V. Typical load regulation is 15 mV/A. The Class-D LDO regulator has line regulation of 1 mV when the supply is swept from 1.8 V to 1.2 V.

Analog LDO regulators have linear output but large quiescent current when the power transistor scales up. Digital LDO regulators have smaller quiescent current, but the control logic complexity and area scales with the power-transistor units. The Class-D LDO regulator, such as the Class-D LDO regulator 100 described in relation to FIG. 1, avoids the disadvantages of both analog and digital LDO regulators by producing linear output with small quiescent current. Moreover, the Class-D LDO regulator as described herein readily supports power transistor scaling and process migration, in some embodiments. The timing efficiency, which is represented in FIG. 11 by a timing figure of merit ($FOMT_T$), is an evaluation of how fast of a response can the LDO regulator achieve, with a normalized power and capacitor parameter. The controller area efficiency, which is represented in FIG. 11 by an area figure of merit ($FOM_A$), is the area of the controller (in $mm^2$) divided by the maximum load (in A), and is an area and current-efficient solution for high current capacity LDO applications.

FIG. 12 shows a high level flow chart for a process 1200 for using a Class-D LDO regulator to regulate an output voltage to match a reference voltage, in accordance with an embodiment of the present disclosure. The process 1200 includes receiving, with an error amplifier, a reference signal and a feedback signal (1202), and providing, with the error amplifier to a PWM generator, a difference signal indicating a voltage difference between the reference signal and the feedback signal (1204). As was described above, the feedback signal is the same as Vout, in an embodiment, or is a fixed fraction of Vout, in an embodiment. The process 1200 further includes providing, with the PWM generator, a pulse width modulated signal based on the difference signal (1204), receiving, at a gate of one or more transistors, the pulse width modulated signal (1206), and providing, at a drain of the one or more transistors, the feedback signal as a regulated voltage that is adjusted to match the reference signal so as to reduce the voltage difference between the reference signal and the feedback signal (1208).

At 1202, an error amplifier (such as the error amplifier 132 or 350, for example) receives a reference signal and a feedback signal. The reference signal corresponds to a desired voltage level or amplitude that the Class-D LDO regulator is configured to provide. The feedback signal corresponds to an output signal provided by a transistor within the Class-D LDO regulator (e.g., Vout or a fixed fraction of Vout).

At 1204, the error amplifier provides a difference signal to a PWM generator (such as the PWM generator 134 or 352, for example). The difference signal indicates a voltage difference between an amplitude of the reference signal and an amplitude of the feedback signal.

At 1206, the PWM generator provides a pulse width modulated signal based on the difference signal. In some embodiments, the PWM generator provides two pulse width modulated signals: a first pulse width modulated signal corresponds to an UP signal, and a second pulse width modulated signal corresponds to a DN signal (such as the UP and DN signals described in relation to FIGS. 3 and 4). In this case, depending on whether the amplitude of the reference signal is greater than or less than the amplitude of the feedback signal, one of the UP and DN signals are maintained without change while the other signal includes pulses. The widths of the pulses define time intervals during which the gate voltage of a transistor is systematically increased or decreased, in an embodiment. When the amplitude of the reference signal matches the amplitude of the feedback signal, the UP and DN signals cancel each other out, such that the gate voltage is maintained without change, in an embodiment.

At 1208, the gate of one or more transistors receives the pulse width modulated signal. In particular, in accordance with an embodiment, when the PWM generator provides an UP signal and a DN signal, a first PMOS transistor receives the UP signal at its gate while an NMOS transistor receives the DN signal at its gate, in an embodiment. In an embodiment, the first PMOS transistor and the NMOS transistor share a drain node that is also connected to the gate of a second PMOS transistor, such as that shown in 354 of FIG. 3. The states of these three transistors are determined based on the pulse width modulated signals that are received at their respective gates, which is described in detail below.

As is depicted in FIG. 4, when the voltage amplitude of the feedback signal exceeds the voltage amplitude of the reference signal, the DN signal is maintained without change, while the UP signal includes pulses whose widths define time intervals during which increased current passes through the first PMOS transistor, causing the drain voltage of the first PMOS transistor (and accordingly the gate voltage of the second PMOS transistor) to increase. The increase in the gate voltage of the second PMOS transistor causes the amount of current passing through the second PMOS transistor to decrease, thereby decreasing the feedback signal, or the drain voltage of the second PMOS transistor.

Alternatively, when the reference signal exceeds the feedback signal, the UP signal is maintained without change, while the DN signal includes pulses whose widths define time intervals during which decreased current passes through the NMOS transistor, causing the drain voltage of the NMOS transistor (and accordingly the gate voltage of the second PMOS transistor) to decrease. This causes the amount of current passing through the second PMOS transistor to increase, thereby increasing the feedback signal, or the drain voltage of the second PMOS transistor.

When the amplitude of the reference signal is equal to the amplitude of the feedback signal, the DN and UP signals are complementary (e.g., the DN signal is high when the UP signal is low, and the DN signal is low when the UP signal is high). In this case, the UP and DN signals cancel one another out, and the gate voltage of the second PMOS transistor is maintained without change to maintain the amplitude of the feedback signal.

In some embodiments, the one or more transistors are implemented as a distributed array of transistors, such as that depicted in FIG. 5, 9, or 10. In particular, in an embodiment, the array of transistors is suitably arranged to have the same source node and the same drain node, with gate nodes connected in series, separated by resistors. In an example, rather than having physical resistors separating the gates of the transistors, the material used to form the gates of the transistors include a polycrystalline silicon material that has inherent resistive characteristics. These characteristics further form a distributed RC filter in an embodiment, such as that described with reference to FIG. 7, that low pass filters the pulse width modulated signal and suppresses switching ripple.

At 1210, the drain of the one or more transistors provides the feedback signal as a regulated voltage that is adjusted to match the reference signal so as to reduce the voltage difference between the reference signal and the feedback signal.

While various embodiments of the present disclosure have been shown and described above, it will be obvious to those skilled in the art that such embodiments are provided by way of example only. Numerous variations, changes, and substitutions will now occur to those skilled in the art without departing from the disclosure. It is noted that various alternatives to the embodiments of the disclosure described herein are employed in practicing the disclosure. It is intended that the following claims define the scope of the disclosure and that methods and structures within the scope of these claims and their equivalents be covered thereby.

What is claimed is:

1. A voltage regulator, comprising:

an error amplifier configured to provide a difference signal indicative of a voltage difference between a reference signal and a feedback signal;

a pulse width modulation generator configured to receive the difference signal and to output a first pulse width modulated signal and a second pulse width modulated signal different from the first pulse width modulated signal based on the difference signal;

a first transistor having a gate connected to a shared drain node of a second transistor and a third transistor, wherein:

the first transistor is configured to provide the feedback signal at a drain of the first transistor, the second transistor is configured to receive the first pulse width modulated signal at a gate of the second transistor, the third transistor is configured to receive the second pulse width modulated signal at a gate of the third transistor, the feedback signal is generated in a form of a regulated voltage that is adjusted to match the reference signal so as to reduce the voltage difference between the reference signal and the feedback signal.

2. The voltage regulator of claim 1, wherein a state of the first transistor is determined by widths of pulses in the first or second pulse width modulated signal.

3. The voltage regulator of claim 1, wherein:

the first pulse width modulated signal has pulse widths defining time intervals during which increased current passes through the second transistor, causing a voltage at the gate of the first transistor to increase, and the second pulse width modulated signal has pulse widths defining time intervals during which decreased current passes through the third transistor, causing the voltage at the gate of the first transistor to decrease.

4. The voltage regulator of claim 1, wherein:

the gate of the third transistor has a gate voltage that is pulled up to decrease an amount of current flowing through the one or more transistors and to decrease the amplitude of the feedback signal, when an amplitude of the feedback signal is greater than an amplitude of the reference signal, the gate voltage is pulled down to increase the amount of current flowing through the third transistor and to increase the amplitude of the feedback signal, when the amplitude of the feedback signal is less than the amplitude of the reference signal, and the gate voltage is maintained unchanged to maintain the amplitude of the feedback signal, when the amplitude of the feedback signal is equal to the amplitude of the reference signal.

5. The voltage regulator of claim 1, wherein the first transistor or the second transistor is formed with a material having a low pass filter characteristic to low pass filter the first or second pulse width modulated signal at the gate of the second transistor or the third transistor and thereby suppress switching ripple in the voltage regulator.

6. The voltage regulator of claim 1, wherein any of the first transistor, the second transistor and the third transistor is implemented as an array of transistors including transistors connected in series.

7. The voltage regulator of claim 6, wherein the gates of the first transistor, the second transistor and the third transistor in the array of transistors include polycrystalline silicon material to low pass filter the first or second pulse width modulated signal.

8. The voltage regulator of claim 6, wherein the transistors in the array of transistors share same drain nodes and source nodes.

9. The voltage regulator of claim 1, wherein the voltage regulator is configured to output a regulated voltage in a bandwidth between 1 and 10 MHz.

10. A method of regulating an output voltage, the method comprising:

receiving, with an error amplifier, a reference signal, and a feedback signal from a drain of a first transistor having a gate connected to a shared drain node of a second transistor and a third transistor;

providing, with the error amplifier to a pulse width modulation generator, a difference signal indicating a voltage difference between the reference signal and the feedback signal;

providing, with the pulse width modulation generator, a first pulse width modulated signal and a second pulse width modulated signal different from the first pulse width modulated signal, based on the difference signal;

receiving, at a gate of the second transistor, the first pulse width modulated signal;

receiving, at a gate of the third transistor, the second pulse width modulated signal; and providing, at the drain of the first transistor, the feedback signal in a form of a regulated voltage that is adjusted to match the reference signal so as to reduce the voltage difference between the reference signal and the feedback signal.

11. The method of claim 10, further comprising determining a state of the second transistor or the third transistor based on widths of pulses in the first or second pulse width modulated signal.

12. The method of claim 10, wherein the first pulse width modulated signal has pulse widths that define time intervals during which increased current passes through the second transistor, causing a voltage at the gate of the first transistor to increase, and the second pulse width modulated signal has pulse widths that define time intervals during which decreased current passes through the third transistor, causing the voltage at the gate of the first transistor to decrease.

13. The method of claim 10, further comprising:

when an amplitude of the feedback signal is greater than an amplitude of the reference signal, pulling up a gate voltage at the gate of the third transistor to decrease the amplitude of the feedback signal;

when the amplitude of the feedback signal is less than the amplitude of the reference signal, pulling down the gate voltage to increase the amplitude of the feedback signal; and when the amplitude of the feedback signal is equal to the amplitude of reference signal, maintaining the gate voltage unchanged to maintain the amplitude of the feedback signal.

14. The method of claim 10, further comprising low pass filtering the first or second pulse width modulated signal at the gate of the second transistor or the third transistor to suppress switching ripple.

15. The method of claim 10, further comprising providing the first or second pulse width modulation signal to gates of the second transistor or the third transistor that are arranged in an array of transistors including transistors connected in series.

16. The method of claim 15, further comprising applying a low pass filter to the first or second pulse width modulated signal at the gates of the second and third transistors in the array of transistors.

17. The method of claim 15, further comprising providing, from each drain of the transistors in the array of transistors, the feedback signal.

18. The method of claim 10, further comprising outputting a regulated voltage in a bandwidth between 1 and 10 MHz.

* * * * *